(12) United States Patent
Onishi et al.

(10) Patent No.: US 10,840,775 B2
(45) Date of Patent: Nov. 17, 2020

(54) CAPACITOR MOUNTING ARRANGEMENT IN A ROTARY ELECTRICAL MACHINE

(71) Applicant: Mitsubishi Electric Corporation, Tokyo (JP)

(72) Inventors: Toshiyuki Onishi, Tokyo (JP); Tomoaki Shimano, Tokyo (JP); Yosuke Uno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 607 days.

(21) Appl. No.: 15/663,917

(22) Filed: Jul. 31, 2017

(65) Prior Publication Data

US 2018/0241290 A1 Aug. 23, 2018

(30) Foreign Application Priority Data

Feb. 17, 2017 (JP) .................................. 2017-027954

(51) Int. Cl.
*H02K 11/02* (2016.01)
*H02K 19/36* (2006.01)
*H02K 11/33* (2016.01)

(52) U.S. Cl.
CPC ........... *H02K 11/02* (2013.01); *H02K 19/365* (2013.01); *H02K 11/33* (2016.01); *H02K 2205/09* (2013.01)

(58) Field of Classification Search
CPC ...... H02K 11/02; H02K 19/365; H02K 11/33; H02K 2205/09
USPC ................... 310/51; 361/500–541, 700–710; 174/523–525
IPC ....................................................... H01G 9/12
See application file for complete search history.

(56) References Cited

U.S. PATENT DOCUMENTS

| 3,210,457 A * | 10/1965 | Hancock | ................ H01G 4/224 174/503 |
| 2010/0295498 A1 | 11/2010 | Tominaga et al. | |
| 2011/0285225 A1* | 11/2011 | Matsuda | .............. B62D 5/0406 310/64 |

(Continued)

FOREIGN PATENT DOCUMENTS

| JP | 2007237435 | * | 9/2007 |
| JP | 2015-061408 A | | 3/2015 |

(Continued)

OTHER PUBLICATIONS

Fostek.com (Year: 2016).*

(Continued)

*Primary Examiner* — Tulsidas C Patel
*Assistant Examiner* — Ahmed Elnakib
(74) *Attorney, Agent, or Firm* — Sughrue Mion, PLLC; Richard C. Turner

(57) ABSTRACT

A rotary electrical machine for a vehicle according to the present invention is provided with a stator, a rotor which is provided facing the stator and which rotates coaxially with the stator, a power module which is connected to the stator, a capacitor which eliminates or reduces switching noise in the power module and has a pressure release valve, a circuit board on which the capacitor is mounted, and a heat sink which encompasses the capacitor, wherein a semi-closed cell foam seal material is provided in contact with the pressure release valve, and the capacitor is fixed to a terminal fixing section of the circuit board, and is also fixed to an inner side of the heat sink by an anti-vibration bond in a portion different from the terminal fixing section.

19 Claims, 3 Drawing Sheets

(56) References Cited

U.S. PATENT DOCUMENTS

| | | | |
|---|---|---|---|
| 2015/0056086 A1* | 2/2015 | Yano | F04C 18/02 |
| | | | 417/410.5 |
| 2015/0245542 A1* | 8/2015 | Falguier | H05K 7/20909 |
| | | | 361/694 |
| 2017/0295662 A1* | 10/2017 | Sakai | F04B 39/06 |
| 2018/0241290 A1* | 8/2018 | Onishi | H02K 19/365 |

FOREIGN PATENT DOCUMENTS

| | | |
|---|---|---|
| JP | 2015-163046 A | 9/2015 |
| WO | WO 2011122038 | * 10/2011 |

OTHER PUBLICATIONS ledinside.com (Year: 2013).*
Office Action dated Jun. 30, 2020 in German Application No. 102017216287.2.

* cited by examiner

CAPACITOR MOUNTING ARRANGEMENT IN A ROTARY ELECTRICAL MACHINE

BACKGROUND OF THE INVENTION

1. Field of the Invention

This invention relates to a rotary electrical machine for a vehicle, wherein a drive unit and an inverter assembly including a power module are integrated and a capacitor having a pressure release valve is mounted.

2. Description of the Related Art

In a power module of a rotary electrical machine for a vehicle, a capacitor is used in order to eliminate or reduce noise generated when a switching element of the power module switches on and off. The capacitor is provided with a pressure release valve in order to prevent increases in the internal pressure due to the generation of gas inside the capacitor as a result of the generation of heat by the current, evaporation of the electrolyte solution, or electrolysis of the electrolyte solution.

In the rotary electrical machine for a vehicle disclosed in Japanese Patent Application Laid-open No. 2015-163046, a capacitor is provided on a seat, with the terminal thereof projecting from the lower surface of a cylindrical shape. Furthermore, the capacitor has a pressure release valve on the upper surface and there is a space above the pressure release valve. In the rotary electrical machine for a vehicle disclosed in Japanese Patent Application Laid-open No. 2015-61408, a capacitor is fixed to a frame, with the terminal thereof projecting from the lower surface of a cylindrical shape. Furthermore, the capacitor has a pressure release valve on the upper surface and there is a space above the pressure release valve.

SUMMARY OF THE INVENTION

However, the rotary electrical machines for a vehicle which are disclosed in Japanese Patent Application Laid-open No. 2015-163046 and Japanese Patent Application Laid-open No. 2015-61408 are subjected to large vibrations which occur in many directions. Therefore, in a capacitor having a certain length, if the capacitor has a single support structure in which only one end of the capacitor is fixed, then a large load is placed on the connected terminal and there is a risk of terminal breakage.

This invention was devised in order to resolve the above-mentioned problem, with the object thereof being to obtain a rotary electrical machine for a vehicle in which breakage or disconnection does not occur in the terminal of a capacitor.

The rotary electrical machine for a vehicle according to the present invention is provided with a stator, a rotor which is provided facing the stator and rotates coaxially with the stator, a power module which is connected to the stator, a capacitor which eliminates or reduces switching noise in the power module and has a pressure release valve, a circuit board on which the capacitor is mounted, and a heat sink which encompasses the capacitor, wherein a semi-closed cell foam seal material is provided in contact with the pressure release valve, and the capacitor is fixed to a terminal fixing section of the circuit board, and is also fixed to an inner side of the heat sink by an anti-vibration bond in a portion different from the terminal fixing section.

According to the rotary electrical machine for a vehicle of this invention, the capacitor has a double support structure, and large loads are not liable to be placed on the connected terminal and the fixing portion.

Consequently, breakage or disconnection does not occur in the terminal of the capacitor.

DESCRIPTION OF THE PREFERRED EMBODIMENTS

Figure 1:
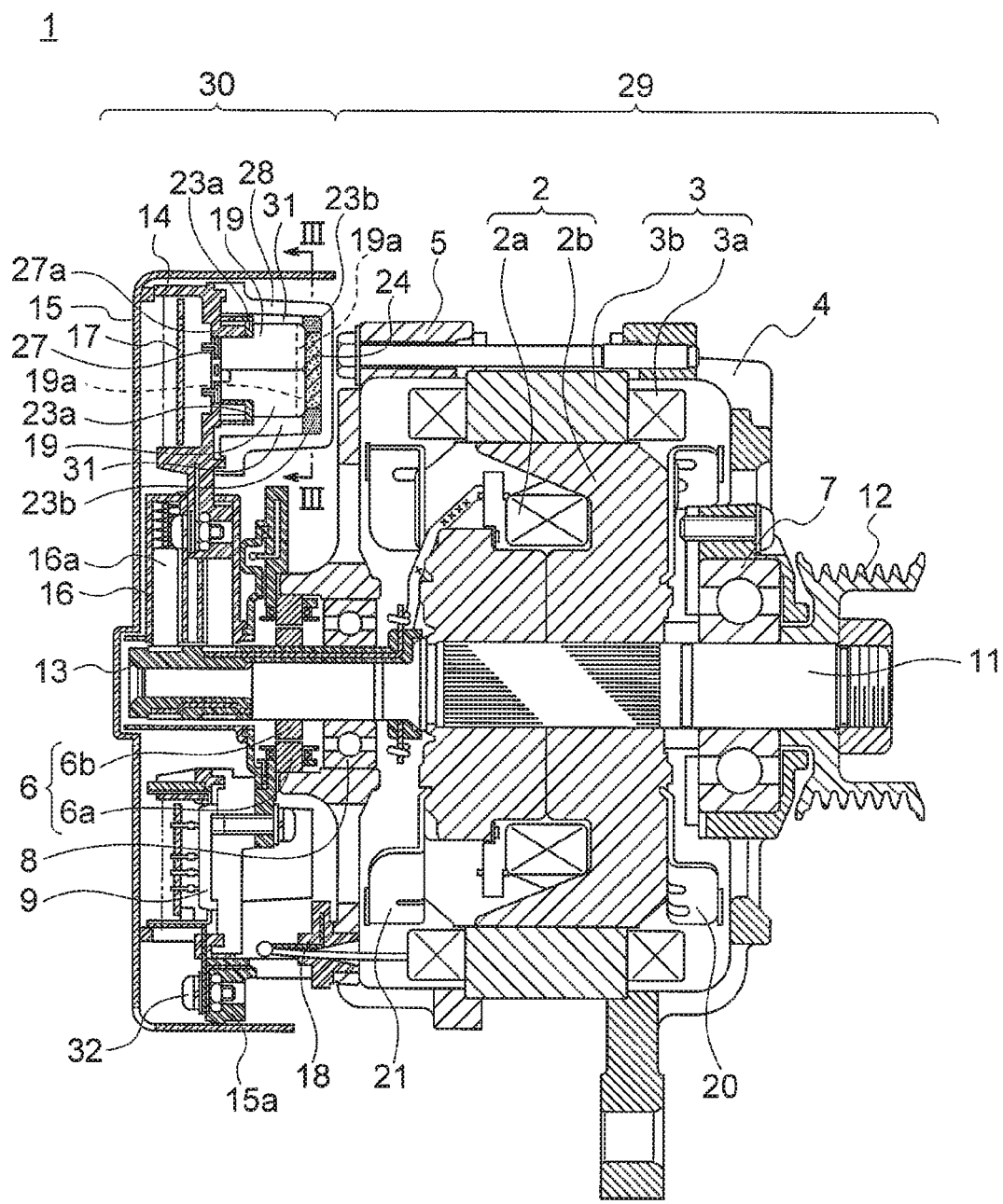
FIG. 1 is a cross-sectional diagram of a rotary electrical machine for a vehicle according to a first embodiment of the present invention.

A preferred embodiment of the rotary electrical machine for a vehicle according to this invention is described below with reference to the drawings. Portions which are the same or equivalent in the drawings are indicated by the same reference numerals and repeated description thereof is omitted here.

First Embodiment

Below, a rotary electrical machine 1 for a vehicle according to the first embodiment of this invention is described with reference to FIGS. 1 and 2.

FIG. 1 is a cross-sectional diagram of a rotary electrical machine for a vehicle according to the first embodiment of the present invention. FIG. 2 is a rear surface diagram of a state where the cover in FIG. 1 has been removed.

As illustrated in FIG. 1, the rotary electrical machine 1 for a vehicle is constituted by a drive unit 29 and an inverter assembly 30.

First, the drive unit 29 will be described.

As illustrated in FIG. 1, a stator 3 is provided inside the front bracket 4 and the rear bracket 5. In the stator 3, a three-phase stator coil 3a is wound about a stator iron core 3b. A rotor 2 is provided on the inner side so as to oppose the stator 3. The rotor 2 rotates coaxially with the stator 3 and is fixed to the rotary shaft 11. The rotary shaft 11 is supported rotatably on the front bracket 4 via the bearing 7. Furthermore, the rotary shaft 11 is supported rotatably on the rear bracket 5 via the bearing 8. One end of the rotary shaft 11 projects from the front bracket 4 and a pulley 12 is attached thereto. The pulley 12 is connected to an internal combustion engine (not illustrated) via a belt (not illustrated).

Furthermore, in the rotor 2, a field coil 2a is wound about the field core 2b. A slip ring 13 for supplying a field current is provided on the field coil 2a. The slip ring 13 projects to the rear side from the rear bracket 5. A brush 16a which supplies current to the slip ring 13 is provided in sliding contact with the slip ring 13. The brush 16a is held by a brush holder 16. Furthermore, fans 20 and 21 for generating a cooling air flow are attached to the end surfaces of the field core 2b.

A magnetic pole position detection sensor 6 which detects the position of rotation of the rotor 2 and the rotary shaft 11 is provided between the bearing 8 and the brush holder 16. A sensor rotor 6b of the magnetic pole position detection sensor 6 is attached to the rotary shaft 11. A sensor stator 6a is provided opposing the sensor rotor 6b on the outer side in the radial direction of the rotary shaft 11.

Next, the inverter assembly 30 will be described.

The inverter assembly 30 is fixed to a rear bracket 5 of the drive unit 29 on which a connecting board 18 has been installed. The inverter assembly 30 and the brush holder 16 are protected by a cover 15. The cover 15 is attached to the rear bracket 5 by screws 32, in the coupling section 15a of the cover 15. The case 14 is provided on the inside of the cover 15.

Figure 2:
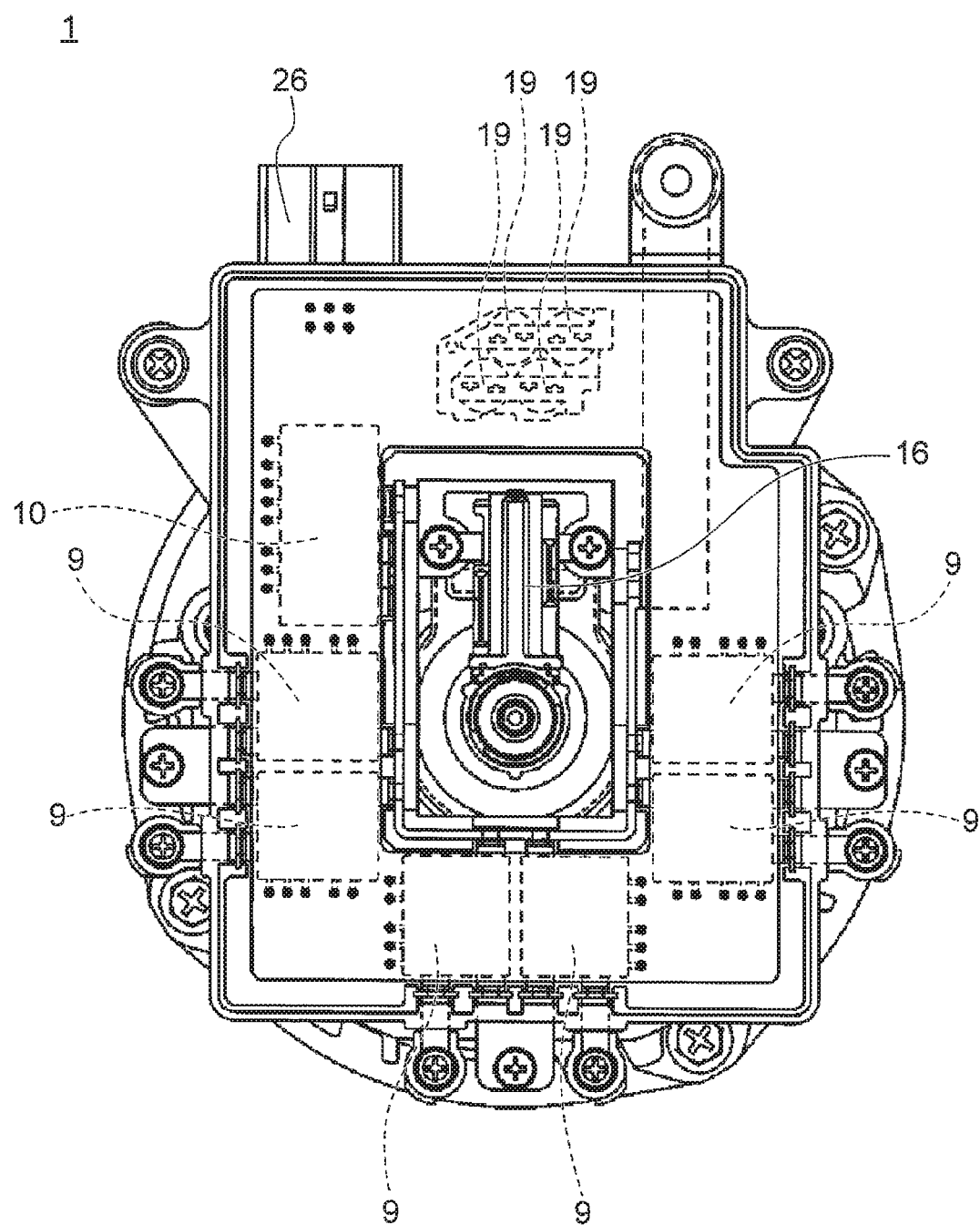
FIG. 2 is a rear surface diagram of a state where the cover has been removed in the rotary electrical machine for a vehicle in FIG. 1.

As illustrated in FIG. 2, a regulator module 9, a field module 10, a control module 17, cylindrical capacitors 19 and a heat sink 28 are provided in a region peripheral to the region of the case 14 through which the rotary shaft 11 is passed. A switching element for supplying armature current during driving, and regulating the armature current during power generation is provided together with peripheral circuitry in the regulator module 9. The regulator module 9 is connected to the stator 3. A switching element for controlling the field current is provided together with peripheral circuitry in the field module 10. The control module 17 controls the regulator module 9 and the field module 10. The capacitors 19 eliminate or reduce switching noise produced by the switching element of the regulator module 9. The heat sink 28 cools the regulator module 9, the field module 10, the capacitors 19 and the connector 26. The regulator module 9 constitutes a power module.

As illustrated in FIG. 1, the capacitors 19 are mounted on a terminal board 27, which is a circuit board, provided in the case 14. The capacitors 19 are electrically connected and fixed to the terminal 27a of the terminal board 27. The outer peripheral portion of the terminal 27a is bonded and fixed to the case 14, by an anti-vibration bond 23a. Furthermore, the heat sink 28 is integrated with the case 14 by the anti-vibration bond 23a. The terminal 27a constitutes a terminal fixing section.

Pressure release valves 19a are provided in the capacitors 19 on the upper surface which are situated on the opposite side from the terminal 27a. The capacitors 19 are fixed to the inner surface of the heat sink 28 by another anti-vibration bond 23b at the periphery of the pressure release valves 19a. In this case, a space 31 is formed between the capacitors 19 and the heat sink 28, and the space 31 is not sealed with resin.

A semi-closed cell foam seal material 24 is provided in contact with the pressure release valves 19a. When the semi-closed cell foam seal material 24 makes contact with the pressure release valves 19a, the semi-closed cell foam seal material 24 may be bonded to either the capacitors 19 or the heat sink 28.

In this way, in the rotary electrical machine 1 for a vehicle according to the first embodiment, the semi-closed cell foam seal material 24 is provided in contact with the pressure release valves 19a, and the capacitors 19 are fixed to the terminal 27a of the terminal board 27. In addition to this, the capacitors 19 are fixed to the inside of the heat sink 28 by the anti-vibration bond 23b, about the periphery of the pressure release valves 19a which are provided on the upper surface in a portion that is different from the terminal 27a and is on the opposite side from the terminal 27a. Therefore, the capacitors 19 have a double support structure, and a large load is not liable to be placed on the connected terminal and the fixing portion. Consequently, breakage or disconnection does not occur in the terminal of the capacitors 19.

The capacitors 19, together with the terminal board 27, are shut off from the outside of the heat sink 28, by the heat sink 28. Consequently, corrosion due to rainwater or the like received from the outside of the heat sink 28, does not occur.

A space 31 is formed between the capacitors 19 and the heat sink 28. Consequently, even if the pressure release valves 19a open and gas inside the capacitors 19 leaks out into the heat sink 28, increase in the pressure inside the heat sink 28 is suppressed and it is possible to prevent damage to the heat sink 28 and the terminal board 27.

The semi-closed cell foam seal material 24 which is bonded to the pressure release valves 19a of the capacitors 19, is sealed in such a manner that the anti-vibration bond 23b does not infiltrate into or adhere to the pressure release valves 19a. Furthermore, the semi-closed cell foam seal material 24 has a structure similar to a sponge that contains bubbles, and is a member that deforms readily such that the pressure release valves 19a open if there is an abnormality in the capacitors 19. Consequently, the semi-closed cell foam seal material 24 serves as a shock absorber between the pressure release valves 19a and the heat sink 28, and protects the inner surface of the heat sink 28 from damage by the pressure release valves 19a when opened.

Second Embodiment

Next, a rotary electrical machine for a vehicle according to a second embodiment will be described with reference to FIG. 3. In the second embodiment, the shape of the semi-closed cell foam seal material is different from the first embodiment.

Figure 3:
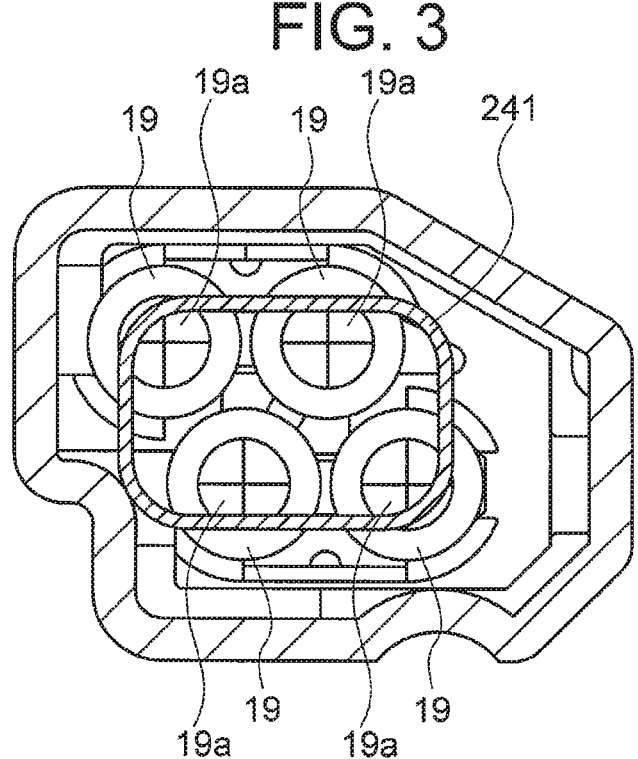
FIG. 3 is a cross-sectional diagram of capacitors mounting section according to a second embodiment of the present invention.

FIG. 3 is a cross-sectional diagram of capacitors mounting section according to a second embodiment of the invention, and shows a cross-section along line III-III in FIG. 1.

As shown in FIG. 3, a semi-closed cell foam seal material 241 is bonded to the upper surface of the capacitors 19. The semi-closed cell foam seal material 241 is ring-shaped and contacts the pressure release valves 19a. Even with this configuration, the semi-closed cell foam seal material 241 contacts the pressure release valves 19a, and therefore when the pressure release valves 19a open, semi-closed cell foam seal material 241 deforms readily, and the function thereof as a shock absorber between the pressure release valves 19a and the heat sink 28 is maintained.

Furthermore, since the semi-closed cell foam seal material 241 is ring-shaped, then it is possible to save resources compared to a case where the seal material is a flat plate shape. Moreover, since the inside portion of the semi-closed cell foam seal material 241 is a space 31, then the volume of the space 31 between the capacitors 19 and the heat sink 28 is increased and a beneficial effect is obtained in that increase in the pressure when the pressure release valves 19a open is suppressed.

Furthermore, as a modification example of the second embodiment, due to the viscosity, etc. of the anti-vibration bond 23b, the semi-closed cell foam seal material 24 does not necessarily have to be configured in an integrated fashion, provided that the semi-closed cell foam seal material 24 makes contact with the pressure release valves 19a.

Third Embodiment

Next, a rotary electrical machine for a vehicle according to a third embodiment will be described with reference to FIG. 4. In the third embodiment, the shape of the heat sink is different from the first embodiment.

Figure 4:
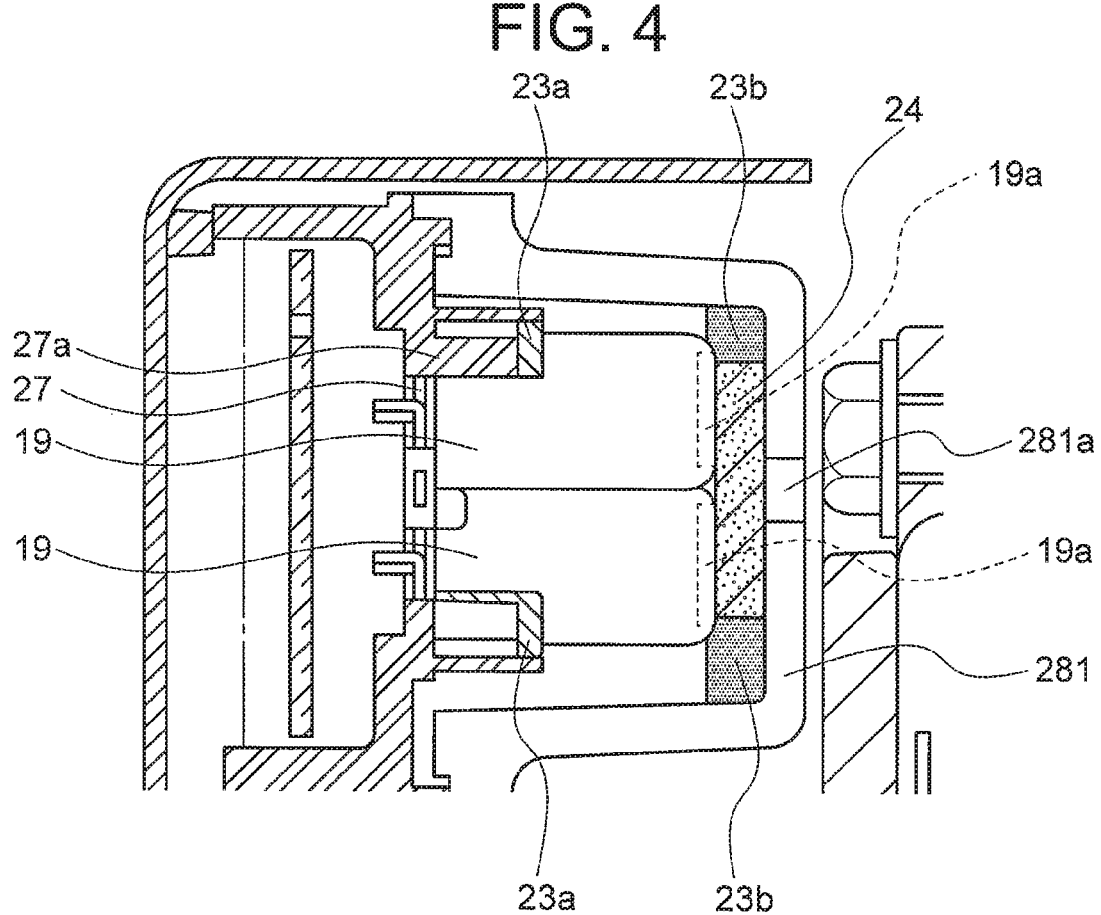
FIG. 4 is a partial cross-sectional diagram of capacitors mounting section according to a third embodiment of the present invention.

FIG. 4 is a partial cross-sectional diagram of capacitors mounting section in an inverter assembly of a rotary electrical machine for a vehicle according to the third embodiment of the present invention.

The capacitors 19 are encompassed by a heat sink 281 and a terminal board 27. The capacitors 19 are fixed to the terminal 27a of the terminal board 27. Furthermore, pressure release valves 19a are provided in the capacitors 19 on the upper surface which is situated on the side opposite from the terminal 27a. The capacitors 19 are fixed to the inside of the heat sink 281 about the periphery of the pressure release valves 19a, by the anti-vibration bond 23b.

A semi-closed cell foam seal material 24 is provided in contact with the pressure release valves 19a. An air hole 281a which passes through the heat sink 281 is formed in the portion of the heat sink 281 that opposes the semi-closed cell foam seal material 24.

In this way, the capacitors 19 are fixed to the terminal 27a and the heat sink 281, and therefore has a double support structure and large loads are not liable to be placed on the connected terminal and the fixing portion. Consequently, breakage or disconnection does not occur in the terminal of the capacitors 19.

Furthermore, when the pressure release valves 19a of the capacitors 19 open, the internal pressure of the heat sink 281 which encompasses the capacitors 19 increases momentarily, and there is a risk of damage to the circuit components which are provided in the heat sink 281 and the terminal board 27. However, if an air hole 281a is provided in the heat sink 281 in this way, it is possible to suppress increase in the internal pressure of the heat sink 281, and the heat sink 281 and circuit components are not damaged.

Furthermore, the air hole 281a is closed by the semi-closed cell foam seal material 24, and therefore foreign matter does not enter readily inside the heat sink 281.

In the first to third embodiments, the anti-vibration bond 23b may have thermal conductivity. By adopting this configuration, the heat generated by the capacitors 19 becomes readily transmitted to the heat sink 28 or 281, and therefore the capacitors 19 are cooled rapidly and the life of the capacitors 19 is improved.

What is claimed is:

1. A rotary electrical machine for a vehicle, comprising:
a stator;
a rotor which is provided facing the stator and rotates coaxially with the stator;
a power module which is connected to the stator;
a capacitor which eliminates or reduces switching noise in the power module and has a pressure release valve;
a circuit board on which the capacitor is mounted; and
a heat sink which encompasses the capacitor,
wherein the pressure release valve is provided on an outside surface of the capacitor
wherein a semi-closed cell foam seal material is provided in contact with the pressure release valve, and
the capacitor is fixed to a terminal fixing section of the circuit board, and is also fixed to an inner side of the heat sink by an anti-vibration bond in a portion different from the terminal fixing section.

2. The rotary electrical machine for a vehicle according to claim 1,
wherein the pressure release valve is provided in the capacitor in a portion on the side opposite to the terminal fixing section, and the capacitor is fixed to the inner side of the heat sink at the periphery of the pressure release valve.

3. The rotary electrical machine for a vehicle according to claim 2, wherein the capacitor is isolated from the outside of the heat sink, by being encompassed within the heat sink.

4. The rotary electrical machine for a vehicle according to claim 2, wherein a space is formed between the capacitor and the heat sink.

5. The rotary electrical machine for a vehicle according to claim 2, wherein the semi-closed cell foam seal material is ring-shaped.

6. The rotary electrical machine for a vehicle according to claim 2, wherein an air hole is formed in a portion of the heat sink that opposes the semi-closed cell foam seal material.

7. The rotary electrical machine for a vehicle according to claim 2, wherein the anti-vibration bond has thermal conductivity.

8. The rotary electrical machine for a vehicle according to claim 1, wherein the capacitor is isolated from the outside of the heat sink, by being encompassed within the heat sink.

9. The rotary electrical machine for a vehicle according to claim 8, wherein a space is formed between the capacitor and the heat sink.

10. The rotary electrical machine for a vehicle according to claim 8, wherein the semi-closed cell foam seal material is ring-shaped.

11. The rotary electrical machine for a vehicle according to claim 8, wherein the anti-vibration bond has thermal conductivity.

12. The rotary electrical machine for a vehicle according to claim 1, wherein a space is formed between the capacitor and the heat sink.

13. The rotary electrical machine for a vehicle according to claim 12, wherein the semi-closed cell foam seal material is ring-shaped.

14. The rotary electrical machine for a vehicle according to claim 12, wherein the anti-vibration bond has thermal conductivity.

15. The rotary electrical machine for a vehicle according to claim 1, wherein an air hole is formed in a portion of the heat sink that opposes the semi-closed cell foam seal material.

16. The rotary electrical machine for a vehicle according to claim 15, wherein the anti-vibration bond has thermal conductivity.

17. The rotary electrical machine for a vehicle according to claim 1, wherein the anti-vibration bond has thermal conductivity.

18. A rotary electrical machine for a vehicle, comprising:
a stator;
a rotor which faces the stator and rotates coaxially with the stator;
a power module which is connected to the stator;
a capacitor which eliminates or reduces switching noise in the power module and has a pressure release valve;
a circuit board on which the capacitor is mounted; and
a heat sink which encompasses the capacitor,
wherein a semi-closed cell foam seal material is in contact with the pressure release valve, and
the capacitor is fixed to a terminal fixing section of the circuit board, and is also fixed to an inner side of the heat sink by an anti-vibration bond in a portion different from the terminal fixing section,
wherein the semi-closed cell foam seal material is ring-shaped.

19. The rotary electrical machine for a vehicle according to claim 18, wherein the anti-vibration bond has thermal conductivity.

* * * * *